(12) United States Patent
Nishino et al.

(10) Patent No.: US 11,453,422 B2
(45) Date of Patent: Sep. 27, 2022

(54) VEHICLE CONTROL SYSTEM

(71) Applicant: HITACHI, LTD., Tokyo (JP)

(72) Inventors: Takayoshi Nishino, Tokyo (JP); Yuhi Tsutsumi, Tokyo (JP); Atsushi Oda, Tokyo (JP); Kentaroh Maki, Tokyo (JP); Takenori Wajima, Tokyo (JP); Kazuo Tokuyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 344 days.

(21) Appl. No.: 16/764,901

(22) PCT Filed: Oct. 23, 2018

(86) PCT No.: PCT/JP2018/039320
§ 371 (c)(1),
(2) Date: May 18, 2020

(87) PCT Pub. No.: WO2019/102769
PCT Pub. Date: May 31, 2019

(65) Prior Publication Data
US 2020/0339171 A1      Oct. 29, 2020

(30) Foreign Application Priority Data

Nov. 21, 2017 (JP) .............................. JP2017-223631

(51) Int. Cl.
*B61L 25/02* (2006.01)
*B60L 3/00* (2019.01)
*B61L 3/00* (2006.01)

(52) U.S. Cl.
CPC ................ *B61L 25/02* (2013.01); *B60L 3/00* (2013.01); *B61L 3/006* (2013.01)

(58) Field of Classification Search
CPC ............. B61L 25/02; B61L 3/006; B60L 3/00
(Continued)

(56) References Cited

U.S. PATENT DOCUMENTS

| 6,442,476 B1* | 8/2002 | Poropat ..................... G01S 5/16 701/23 |
| 9,711,050 B2* | 7/2017 | Ansari .................... G08G 1/162 |
| 11,307,042 B2* | 4/2022 | Slusar ....................... B60R 1/00 |

FOREIGN PATENT DOCUMENTS

| EP | 3069955 A1 | 9/2016 |
| JP | 2008-247154 A | 10/2008 |

(Continued)

OTHER PUBLICATIONS

International Search Report of PCT/JP2018/039320 dated Jan. 15, 2019.

*Primary Examiner* — Gertrude Arthur Jeanglaude
(74) *Attorney, Agent, or Firm* — Mattingly & Malur, PC

(57) ABSTRACT

The present invention is provided with: a sensing unit which is provided in a vehicle and measures the three-dimensional shape of an object; a matching unit for performing matching between multiple sets of structure information, in which are associated a data group indicating the three-dimensional shapes of structures provided beforehand near a path the vehicle will travel along and positional information indicating the posit ions of the structures, and a data group indicating the three-dimensional shape of the object measured by the sensing unit, and for specifying the position of the object; and an estimated position determination unit for determining, with the position specified by the matching unit as a reference position, the estimated position of the vehicle on the basis of the reference position.

7 Claims, 9 Drawing Sheets

(58) Field of Classification Search
USPC .......................................................... 701/19
See application file for complete search history.

(56) References Cited

FOREIGN PATENT DOCUMENTS

| JP | 2013-107434 A | 6/2013 |
| JP | 2014-220858 A | 11/2014 |
| JP | 2015-093532 A | 5/2015 |
| JP | 2017-001638 A | 1/2017 |

\* cited by examiner

FIG. 3

| X | Y | Z | P |
|---|---|---|---|
| ... | ... | ... | ... |
| x1 | y1 | z1 | 1 |
| x1 | y1 | z2 | 0 |
| x1 | y1 | z3 | 0 |
| ... | ... | ... | ... |

FIG. 8

| ID | POSITION |
|---|---|
| ... | ... |
| A | 1000-1010 |
| B | 1300-1310 |
| C | 1600-1610 |
| ... | ... |

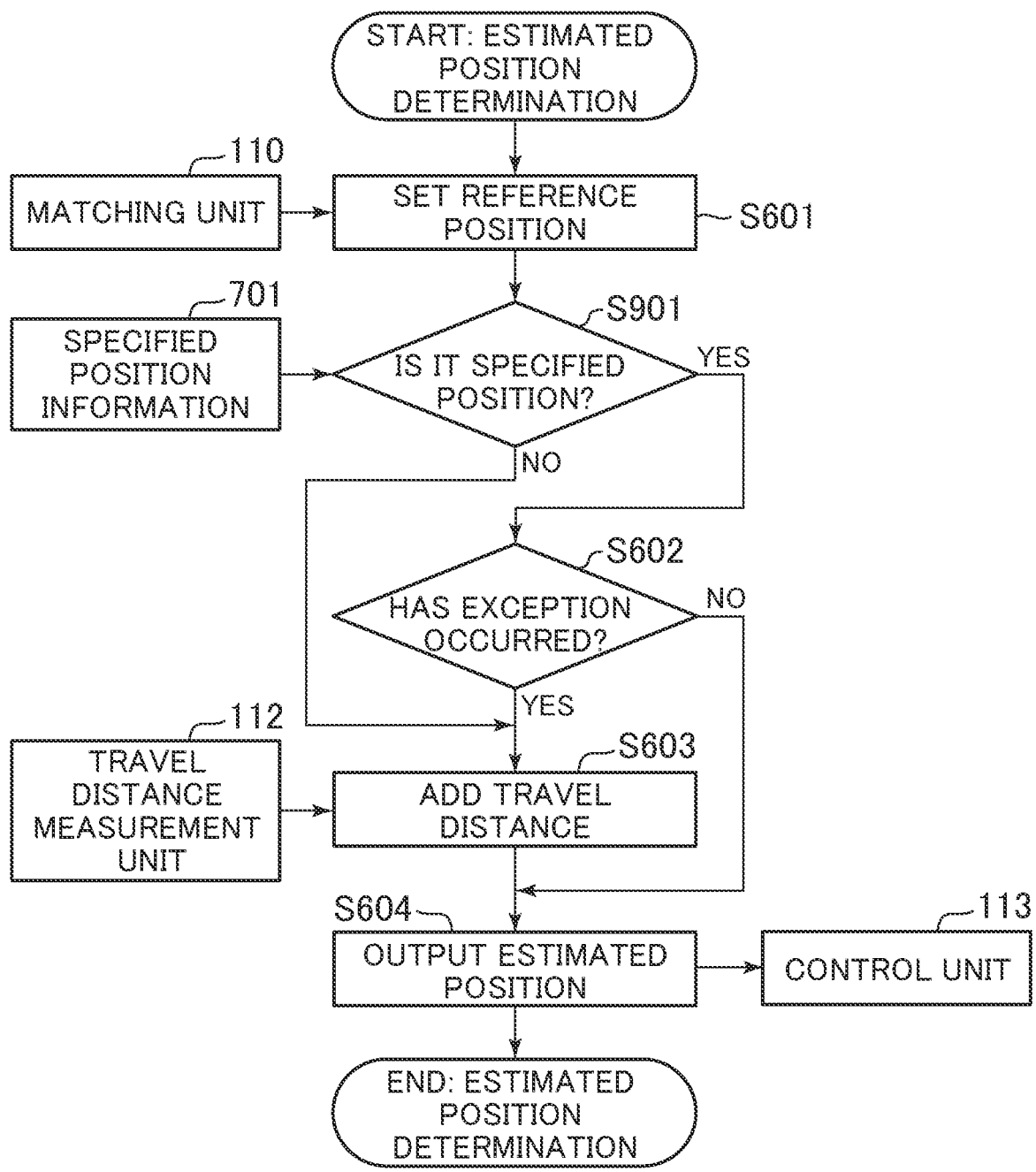

VEHICLE CONTROL SYSTEM

TECHNICAL FIELD

The present invention relates to a vehicle control system and is favorably suited for application to, for example, a vehicle control system that estimates the position of a vehicle.

BACKGROUND ART

To operate railway vehicles on time and control the vehicles to travel, keeping a safety distance between them, information on the positions of the vehicles is absolutely necessary.

Currently, as means for estimating the position of a railway vehicle, a means (odometry) for calculating travel distance from a point of reference by a product of the number of rotations of a wheel and the wheel diameter is widely used. However, with this means, it is inevitable to accumulate errors in estimated positions in proportional to travel distance because of idle rotation and gliding of wheels, influence of wear, and others Therefore, as position correction means to reset accumulated errors, a means in which a transponder with its position information prestored therein is installed between rails and the position information is read out whenever a vehicle passes over it is widely used in conjunction with the above-mentioned odometry. Although this means is effective to correct estimated positions, it is inevitable to reaccumulate errors in estimated positions after correction is made. For this reason, in order to continue to restrict errors in estimated positions within a range required for vehicle operation control, it is needed to lay a series of transponders at intervals of a certain distance (e.g., several hundred meters) and cost of infrastructure construction for providing them and maintenance among others is required.

In this regard, a method is disclosed in which a relationship between shape of trolley wires for supplying a vehicle with electric power and an absolute position is prestored in a database and the vehicle's absolute position is located by comparing the trolley wire shape acquired while the vehicle travels with the database contents (refer to Patent Literature 1). Herein, an angle sensor provided on a pantograph is mentioned as a way of acquiring the trolley wire shape while the vehicle travels.

Also, a method is disclosed in which a vehicle's own position is estimated by matching time-series data acquired by measuring overhead wires with a distance sensor with the corresponding time-series data that has been measured in advance and stored (refer to Patent Literature 2). Herein, wear, deflection, and height of the overhead wires are mentioned as feature values of the overhead wires which are associated with position.

Also, a method is disclosed in which a database on structures (features) provided along a track, such as sleepers, overhead wire joints, and insulators is prepared, these structures are detected with a contactless sensor, and the current position is located by reference to, inter alia, the number and intervals of the structures (refer to Patent Literature 3).

According to these methods, by using overhead wires originally existing to give driving energy to vehicles in electric railways, vehicle position estimation can be accomplished without newly installing transponders and their alternative equipment on ground and at low cost, less the cost for installing them.

CITATION LIST

Patent Literature

Patent Literature 1: Japanese Unexamined Patent Application Publication No. 2014-220858
Patent Literature 2: Japanese Unexamined Patent Application Publication No. 2015-93532
Patent Literature 3: Japanese Unexamined Patent Application Publication No. 2013-107434

SUMMARY OF INVENTION

Technical Problem

However, because the method described in Patent Literature 1 and the method described in Patent Literature 2 rely on a slight change of the features of overhead wires (trolley wires) as a function of position, highly accurate sensors are needed and coping with pantograph bounce and wear of overhead wires is required to implement highly accurate and highly reliable position estimation by such method.

Besides, the method described in Patent Literature 3 relies on the number and intervals of sleepers, insulators, etc., taken as marks, for detection from a vehicle traveling at high speed. Thus, to implement highly accurate and highly reliable position estimation, sensors capable of detecting outside world information minutely (e.g., sensors with a high scanning frequency) and responsive and fast processing are needed and coping with a case of skipping some of the marks is required.

The present invention has been developed in view of the foregoing issues and is intended to propose a vehicle control system capable of estimating the position of a vehicle with high accuracy without installing both transponders and alternative equipment on ground and without using highly accurate sensors.

Solution to Problem

To solve the above-noted problem, the present invention comprises a sensing unit which is provided on a vehicle and measures three-dimensional shapes of objects, a matching unit which performs a process of matching between information on a plurality of structures in which a data group representing three-dimensional shapes of structures provided beforehand adjacent to a track on which the vehicle travels is associated with position information representing positions of the structures and a data group representing three-dimensional shapes of objects measured by the sensing unit and locates positions of the objects, and an estimated position determination unit which sets a position located by the matching unit as a reference position and determines an estimated position of the vehicle based on the reference position, the invention being characterized in that the structures provided beforehand are components constituting contact line equipment adjacent to the track including a trolley wire and a catenary and hangers to hang and support the trolley wire and that the sensing unit is installed in a position shifted from underneath a trolley wire which is one of the components constituting the contact line equipment and measures three-dimensional shapes of the contact line equipment from an oblique direction.

In a configuration described above, because the process of matching is performed using data groups representing three-dimensional shapes, the vehicle position can be estimated with high accuracy.

Advantageous Effects of Invention

According to the present invention, it is possible to implement a highly reliable vehicle control system.

BRIEF DESCRIPTION OF DRAWINGS

FIG. 3 is a diagram representing one example of a data group representing three-dimensional shapes according to the first embodiment.

FIG. 8 is a diagram representing one example of specified position information according to the second embodiment.

FIG. 9 is a diagram illustrating one example of a processing procedure related to the estimated position determination unit according to the second embodiment.

DESCRIPTION OF EMBODIMENTS

In the following, one embodiment of the present invention is described with respect to the drawings.

(1) First Embodiment

Figure 1:
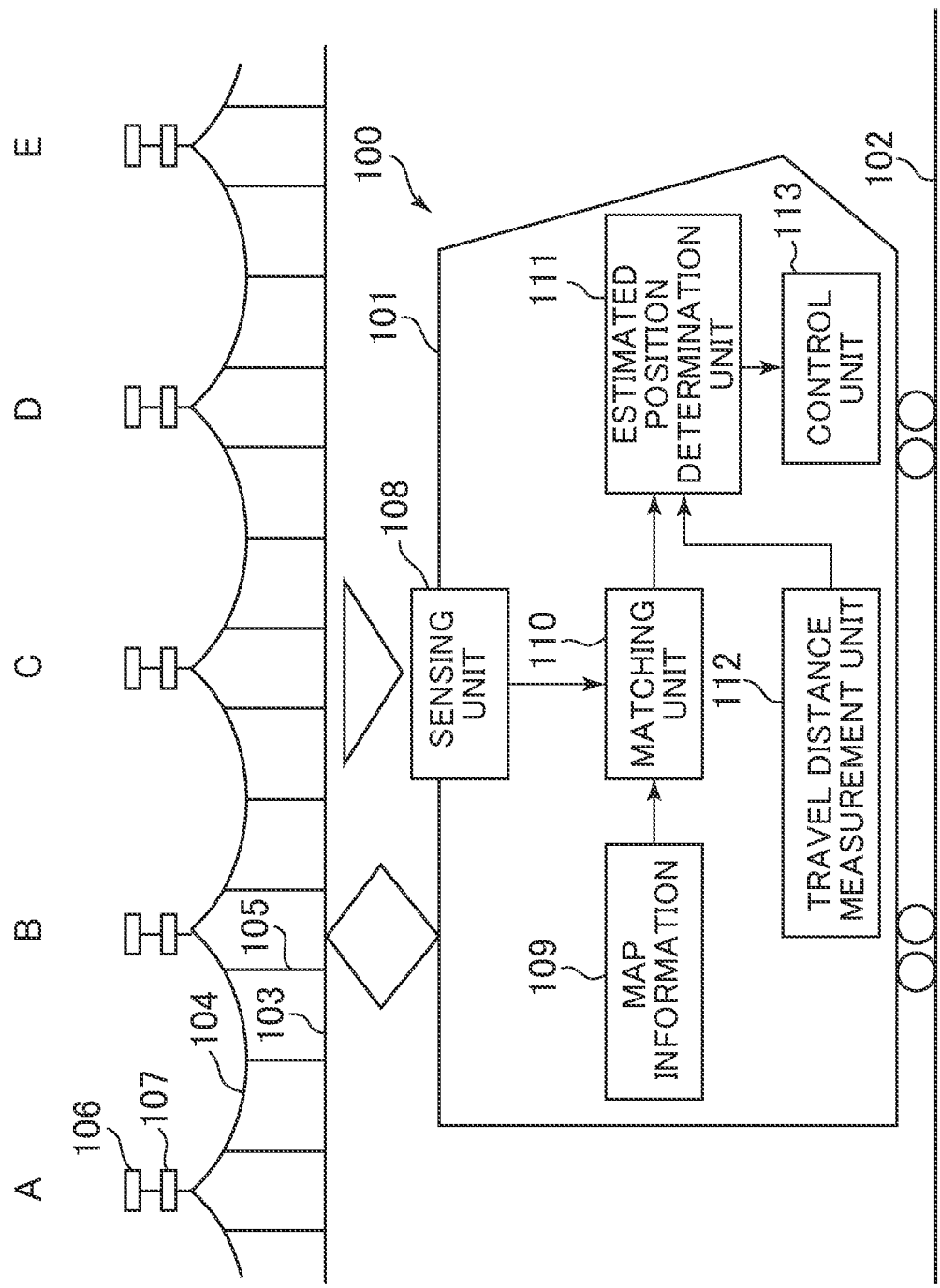
FIG. 1 is a diagram depicting one example of a configuration of a vehicle control system according to a first embodiment.

In FIG. 1, a reference numeral 100 denotes a vehicle control system as a whole according to a first embodiment. The vehicle control system 100 is configured including a vehicle 101. The vehicle 101 travels on a track 102, while supplied with electric power by contact line equipment provided along the track 102.

Typical components of the contact line equipment are as follows: a trolley wire 103 contacting with the vehicle 101 through a pantograph, a catenary 104 and hangers 105 to hang and support the trolley wire 103, and supports 16 and insulations 107 to support them. It is common that, in addition to these components, the contact line equipment is comprised of various elements, such as tensioners, feed line branches, and insulators for insulation. Unless noted otherwise, these components constituting the contact line equipment above the vehicle 101 will hereinafter be referred to as "overhead wiring" collectively.

The vehicle 101 is provided with a sensing unit 108, map information 109, a matching unit 110, an estimated position determination unit 111, a travel distance measurement unit 112, and a control unit 113.

The sensing unit 108 scans the overhead wiring with an LIDAR (Light Detection and Ranging), measures three-dimensional shapes of the overhead wiring, and sends data of the three-dimensional shapes (measurement data) to the matching unit 110. Here, the LIDAR is a device which measures distance to an object by irradiating the object with laser and receiving light of its reflections. From its principle, the accuracy of distance measurement is as relatively high as from several millimeters to several centimeters. Taking one laser beam which goes straight as a basic unit, by changing an irradiation direction at as a high rate as several tens of Hz successively and periodically, a surface shape of the object is captured as a collection of minute points (a point cloud). Therefore, the above-mentioned measurement data is data (a data group) in which three-dimensional shapes of the overhead wiring are represented in terms of a point cloud.

Additionally, as the LIDAR of the sensing unit 108, a three-dimensional LIDAR allowing for changing an irradiation direction in three dimensions is assumed. Besides this, as the LIDAR, a two-dimensional LIDAR allowing for changing an irradiation direction in two dimensions is available. Even if a single one or a combination of multiple ones of the latter LIDAR was used, a surface shape of the object can likewise be captured (though the amount of information that can be acquired at a time is smaller than when the three-dimensional LIDAR is used) and, therefore, matters that will be described hereinafter can likewise be carried out.

Figure 2:
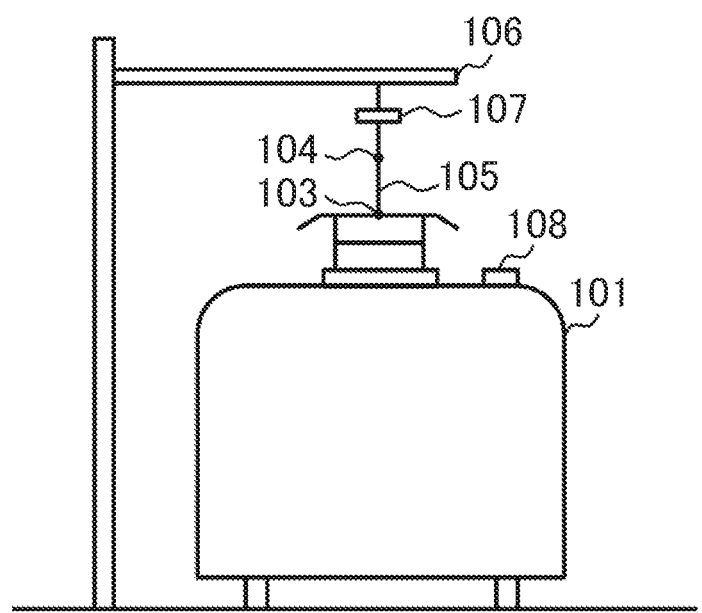
FIG. 2 is a diagram depicting one example of a positional relationship among a vehicle, a sensing unit, and overhead wiring according to the first embodiment.

Here, a positional relationship among the vehicle 101 is described, sensing unit 108, and overhead wiring (trolley wire 103, catenary 104, hangers 105, supports 106, insulations 107) using FIG. 2 depicting a state of the vehicle 101 when viewed from a cross-dimensional direction.

In the sensing unit 108, the LIDAR is installed on the vehicle 101 so that it can scan the overhead wiring from an oblique direction, assuming that a contact point between the pantograph and the trolley wire 103 is a center. This is because that it is advantageous for later processing (a matching process which will be explained with FIG. 5) to capture more feature points of the overhead wiring as information and aim to allow for capturing as many components of the overhead wiring as possible. For instance, if scanning is performed from a position underneath the trolley wire 103, the hangers 105 and the catenary 104 which hang the trolley wire 103 in a fundamentally vertical direction are hidden behind the trolley wire 103 and fall out of a range of scanning. In contrast, if the sensing unit 108 is installed in a position shifted from underneath the trolley wire 103 and scanning is performed obliquely from that position, lateral sides of the hangers 105 set up periodically and the catenary 104 slackening periodically fall within a range of scanning and their features can be captured into measurement data.

Here, supplement explanation is described concerning shapes of the supports 106. Because the supports 106 need to support all structures under them, including the catenary 104 and the trolley wire 103, they are usually made of a stiff material such as steel frames and their size is particularly large among the structures of the overhead wiring. Therefore, their three-dimensional shapes are comparatively easy to capture with the LIDAR. Because the supports are free of worry about slackening and swinging which occur as in electric wires, it can be said that they can be captured by scanning with the LIDAR the same every time the vehicle 101 travels with relatively less worry about losing sight of them. It is common that the supports 106 are built at intervals of several hundred meters.

Now terminating the description with FIG. 2, it is described that the remaining system components with which the vehicle 101 is provided, using FIG. 1 again.

Map information 109 is a database in which three-dimensional shapes of the overhead wiring throughout the track 102 are stored in association with position information thereof. To create such a database, it is expedient that a vehicle provided with an LIDAR that provides a high definition image as the sensing unit 108 does or a higher definition image should be made to travel along the track beforehand and measurement data obtained by the LIDAR (processed if necessary) should be stored. Associating the three-dimensional shapes obtained by measurement with positions can be realized by incorporating a method that enables it to measure an absolute position with an error which is, at most, on the order of several tens of centimeters, such as, e.g., a DGPS (Differential Global Positioning System). A method of creating the database is not limited to that noted above, provided that a result equivalent to that achieved by this means is obtained.

Because map information 109 is information corresponding to three-dimensional shapes throughout the track 102, its data size is relatively large. Although how to store that data does not matter specifically, the data should be stored in a secondary storage device (such as a magnetic disk, an optical disk, or a flash memory storage device, omitted from depiction) in the present embodiment. In processing by the matching unit 110, which will be described later, a part of the map information 109 corresponding to a section that is required for the processing is read and loaded to a main storage device (omitted from depiction) and used.

Figure 3:
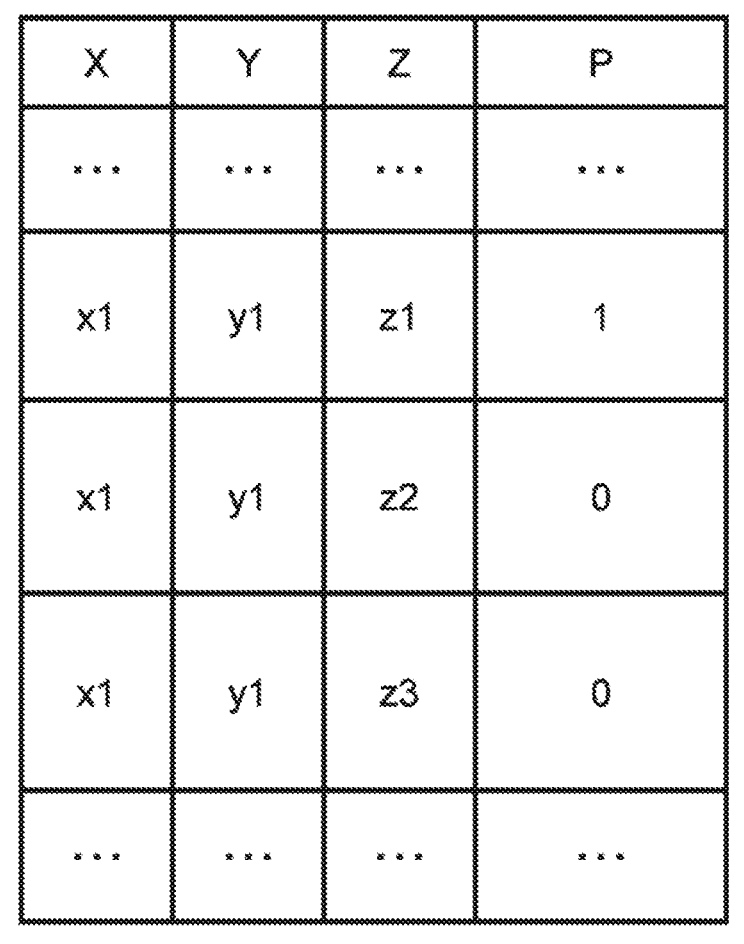

Here, using FIG. 3, a data format of the three-dimensional shapes which the map information 109 stores is described. The three-dimensional shape data is comprised of X, Y, and Z representing a coordinate system of a three-dimensional space and a value P at each point. X, Y, and Z are the coordinates of points in the three-dimensional space partitioned into grids at granularity (e.g., several centimeters) enough to represent the three-dimensional shapes of the components of the overhead wiring in terms of a point cloud. The value P is a binary value indicating whether a point is present or absent. For convenience, it is assumed that, when the value is "1", it indicates that a point is present; when the value is "0", it indicates that a point is absent. With respect to each point being represented by a combination of X, Y, and Z, a mechanism is such that, by drawing points for which the value P is "1", a three-dimensional shape can be represented in terms of a point cloud.

Additionally, the X, Y, and Z axes do not necessarily bisect each other at right angles and only need to be linearly independent of each other, so that they can represent a three-dimensional space. For example, given that X corresponds to a direction along the track 102, Y corresponds to a direction of crossing the track, and Z corresponds to a height direction, a value of X directly maps to a position on the track 102; this is convenient to describe the three-dimensional space along the track 102 involving objects that are now going to be processed.

Now terminating the description on FIG. 3, it is returned to the description on FIG. 1 again.

From among pieces of three-dimensional shape data (map data) which have been read from the map information 109 and prestored, the matching unit 109 is a means that determines one piece of such data that most exactly matches a piece of measurement data of three-dimensional shapes of the overhead wiring received from the sensing unit 108 and locate a position corresponding to it. The located position is output to the estimated position determination unit 111. Later, details of particular processing will be described using FIG. 4 and FIG. 5.

The estimated position determination unit 111 is a means that estimates the position of the vehicle 101 (determines the estimated position) from the position located by the matching unit 110 and travel distance of the vehicle obtained by the travel distance measurement unit 112 which will be described below. Later, details of particular processing will be described using FIG. 6. The estimated position thus determined is sent to the control unit 113.

The travel distance measurement unit 112 measures travel distance of the vehicle 101 and sends it to the estimated position determination unit 111. Means for measuring the travel distance does not matter specifically. A means that calculates the distance by counting the number of rotations of a wheel and multiplying the number by the wheel diameter which has been prestored is commonly used for railway vehicles, as noted in the Background Art section and, for example, such means is assumed to be used. In addition, a method of calculating the travel distance by integrating the outputs of a speed sensor is also available.

The control unit is a vehicle control application using estimated positions of the vehicle 101. What is equivalent of such application is, for example, an Automatic Train Operation (ATO) that automatically controls acceleration and deceleration so that the vehicle 101 will travel on prescheduled time (a service planning diagram) between specified points (e.g., between stations). To accelerate or decelerate the vehicle 101 automatically according to limiting speed specified per position, it is desirable to keep track of the position of the vehicle 101 in units of, at least, several meters. Besides, in the case of Train Automatic Stopping-position Control (TASC) that automatically stops the vehicle 101 in specified stopping place, such as at platforms of a railway station, it is required to keep track of the position of the vehicle 101 within an accuracy of, at least, several centimeters. When the sensing unit 108 is implemented using an LIDAR having the accuracy of distance measurement from several millimeters to several centimeters and map information 109 has been created with it, estimated positions obtained by the estimated position determination unit 111 can be expected to suffice the purpose of the ATO that functions as noted above, as long as there is no decrease in the amount of information in the matching unit 110. Besides, in addition to the ATO, a signaling system, Automatic Traffic Protection (ATP), to control braking to ensure keeping a safety distance between vehicles is also an example of the application using estimated positions of the vehicle 101.

Additionally, part or all of the functions (the sensing unit 108, matching unit 110, estimated position determination unit 111, travel distance measurement unit 112, and control unit 113) of the vehicle 101 may be implemented in such a way that a CPU (Central Processing Unit) which is omitted from depiction reads and loads a program to the main storage device and executes it (by software), may be implemented by hardware such as dedicated circuits, or may be implemented through combination of software and hardware. Besides, part or all of the functions of the vehicle 101 may be implemented by a computer capable of communicating with the vehicle 101.

Figure 4:
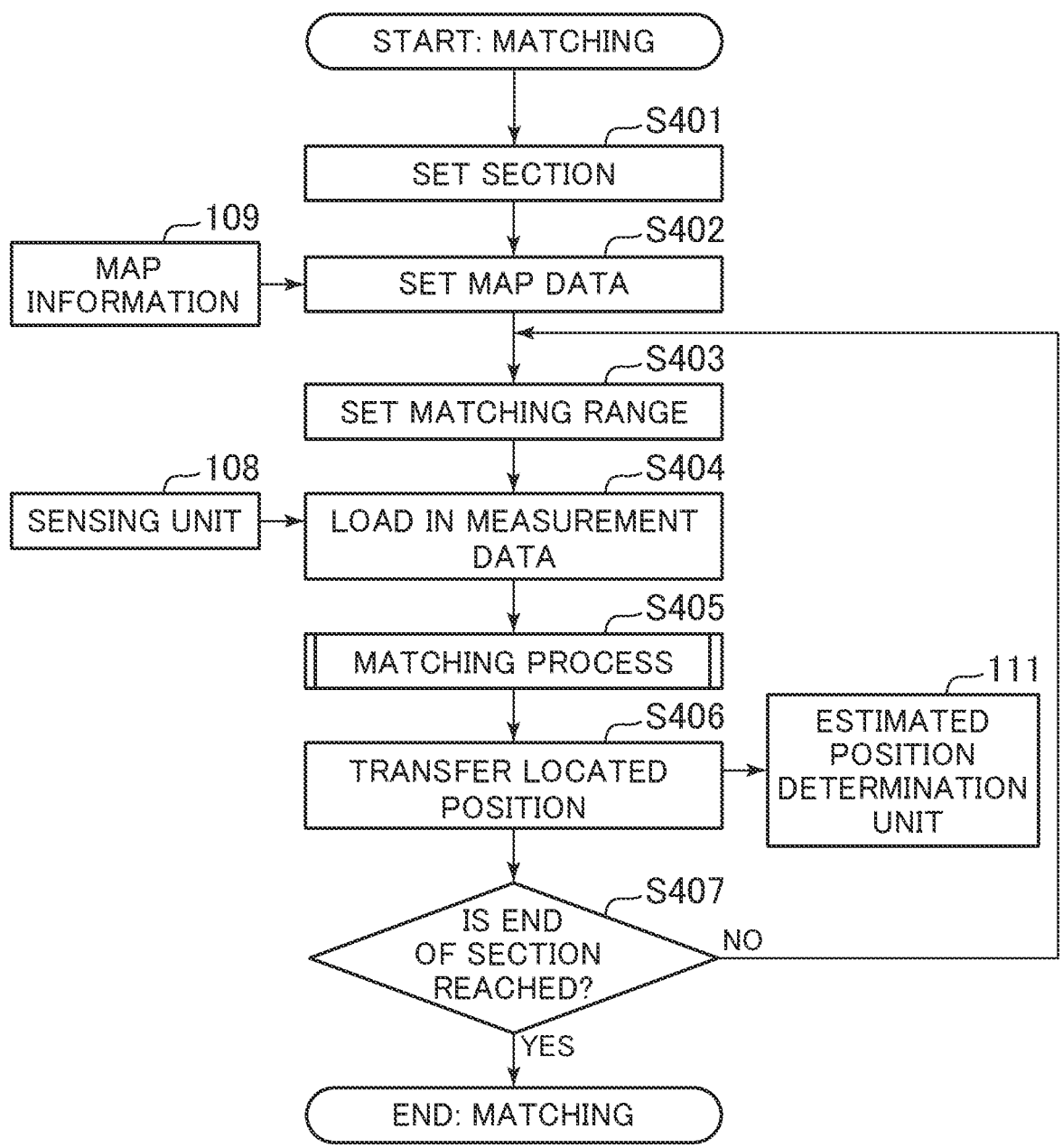
FIG. 4 is a diagram illustrating one example of a processing procedure related to a matching unit according to the first embodiment.
Figure 5:
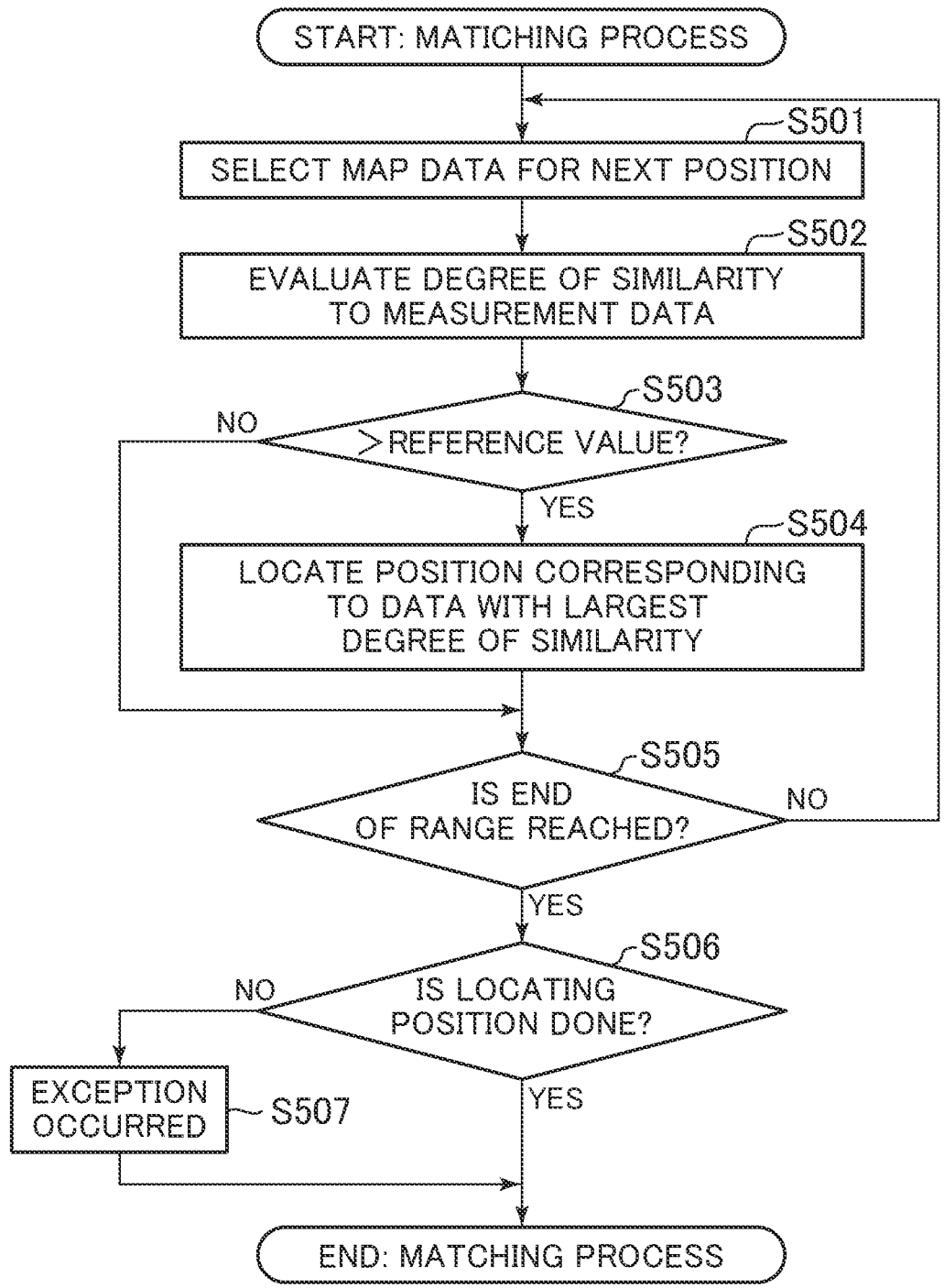
FIG. 5 is a diagram illustrating one example of a processing procedure related to the matching unit according to the first embodiment.

Now terminating the description on FIG. 1, a description of processing by the matching unit 110 is described using FIG. 4 and FIG. 5.

Respective processing tasks (steps S401 thru S406) which are illustrated in FIG. 4 are executed by the matching unit 110. Each processing task is described below.

At step S401, the matching unit 110 sets a section for which to apply subsequent processing throughout the track 102. The reason of setting a section is that a map (map data) of three-dimensional shapes of the overhead wiring for that section is read from the map information 109 and loaded into the main storage device. Hence, when selecting a section, how long the section is depends on a balance between the map data size and the capacity of the main storage device. Practically, it is preferable to, for example, set a track between stations as one section so that, while the vehicle stops at a station, map data for the section to a next station will be read in, since it is not required to read in map data newly when the vehicle is traveling.

At step S402, the matching unit 110 reads and loads map data for the section set at step s401 from the map information 109 to the main storage device, as noted above.

At step S403, in the map data read and loaded to the main storage device, the matching unit 110 determines what range of data to be compared with measurement data which will be read in from the sensing unit 10 at a next step S404 (setting a matching range). Detail of this comparison will be described in step S405 and the purpose of the compassion is to locate a candidate position of the vehicle 101 (vehicle position). Hence, owing to the fact that the track 102 on which the vehicle 101 travels is fixed and the vehicle 101 will not move drastically from the position of a previous observation point, a certain range on the track 102 in which the vehicle 101 is anticipated to be positioned now can be set as a reasonable range.

This processing task is provided, intended to narrow down map data which is used for comparison with measurement data to this reasonable range beforehand and reduce the computation amount at a later step S405. How to set a range is, for example, as below: because there is a loop which returns from step S407 to S403 after step S406 of locating a candidate vehicle position, as will be described later, relative to the vehicle position once located at step S406 as a starting point, the range can be set as an additional distance the vehicle can travel for a period (e.g. 100 ms) of the loop from there. According to this example, it takes x0 to stand for the vehicle position as the starting point, if the vehicle 101 travels at about 72 km/h, then it will travel about 2 m for 100 ms; therefore, the range can be set as [x0, x0+2 m]. Practically, allowing for a margin a taking account of, inter alia, errors of position and vehicle speed, the range should expediently be set as [x0−α, x0+2 m+α]. Additionally, when step S403 is executed for the first time, there is no information on a candidate position located at step S406; therefore, it is expedient that the range should be set relative to any initial position information such as the position of a starting-point station.

At step S404, the matching unit 110 receives measurement data of the overhead wiring measured with the LIDAR from the sensing unit 108 and loads the data into the main storage device. At this time, because, in a subsequent step S405, the measurement data is compared with the map data read in at the previous step S402, conversion processing for making the formats of both data mentioned consistent and comparable is performed at the same time. Additionally, because the step 404 is computed many times in the loop from step S403 to step S407, computation of the loop becomes easier by making the map data format consistent with the measurement data format beforehand when the map data has been read in at the previous step S402 than converting the measurement data format to make it consistent with the map data format.

At step S405, the matching unit 110 finds one piece of data that is similar to the measurement data mentioned above in the determined range of the map data mentioned above and locates a position corresponding to it (matching process). Detail of this matching process will be described later with FIG. 5.

At step S406, the matching unit 110 transfers the position located at step S405 to the estimated position determination unit 111.

At step S407, the matching unit 110 decides whether or not the position located at step S405 comes at the end of the section set at step S401. If having decided that the position does not come at the end, the matching unit 110 returns the processing to step S403 to continue position estimation. The matching unit 110 terminates the processing upon having decided that the position comes at the end. Thereby, the steps S403 thru S407 form the loop. A period of its computation is assumed to be, for example 100 ms, as mentioned previously.

Then, detail of the step S405 is described using a flowchart in FIG. 5. Respective processing tasks (steps S501 thru S507) which are illustrated in FIG. 5 are executed by the matching unit 110. Each processing task is described below.

At step S501, the matching unit 110 selects one piece of map data which is used for comparison with measurement data at a subsequent step S502. As will be described later, steps S501 thru S505 form a loop. Intention hereof is to carry out matching for all pieces of map data within the matching range set at step S403 noted previously. For this purpose, at the step S501, the matching unit 110 selects a piece of map data one after another from a starting-point position of the matching range.

At step S502, the matching unit 110 compares the piece of map data selected at step S501 with measurement data and evaluates a degree of similarity. Diverse measures of a degree of similarity are conceivable. For example, if a representation in the data format presented in FIG. 3 is applied, checking for both map data and measurement data is performed as to whether data is present (P=1) or absent (P=0) in corresponding grids (with a combination of X, Y, and Z) in the three-dimensional space and, if no match between both data is found, checking the same with respect to a neighboring grid (X+1, Y, and Z, and others) is performed. A conceivable measure is as below: weighted scores are given, such as a score of 2 if a match is found in corresponding cells and a score of 1 if a match is found in a neighboring cell, and a degree of similarity is evaluated by the total score. In this case, the higher the score, the higher will be the degree of similarity. A measure for evaluating a degree of similarity is not limited to that noted above, provided that it serves the purpose.

At step S503, the matching unit 110 decides whether or not an evaluation value of the degree of similarity obtained at step S502 fulfills a predetermined criterion value (exceeds a threshold) (that is, whether or not it is larger than a criterion value in the case of the illustrated measure). The matching unit 110 shifts the processing to step S504, if having decided that the evaluation value fulfills the criterion value, or skips the step S504 and shifts the processing to step S505, if having decided that the evaluation value does not fulfill the criterion value.

Intention of this decision processing is to prevent data for which the degree of similarity is less than the criterion value from being used for locating a candidate vehicle position, no matter how high is its relative degree of similarity within the matching range. For instance, in a case where the sensing unit 108 fails or the distance measurement does not work properly because of a bad weather or for other reasons, measurement data differs not a little from its corresponding map data expected originally. As a result, no matter how much such measurement data is compared against map data, a degree of similarity enough to fulfill the criterion cannot be obtained probably. Taking advantage of this, detecting if the sensing unit 108 does not work properly (that is, if the obtained estimated position is not reliable) is a further purpose besides above-noted intention.

At step S504, among the pieces of map data selected one after another at the step S501 in the currently set matching range, the matching unit selects a piece of data having the highest degree of similarity evaluated at the step S502 and locates a position corresponding to the piece of data. At this time, data for which the degree of similarity is less than the criterion value is excluded from this processing, as described for the step S503. That is, if the degree of similarity of all the pieces of map data in the matching range is less than the criterion value, the matching unit does not locate a position at the step S504. If the degree of similarity of at least one piece of map data is above the criterion value, the matching unit locates a position corresponding to the piece of data having the largest degree of similarity among them. These two situations are separated at the step S504 for use at a later step S506.

At step S505, the matching unit 110 decides whether or not the pieces of map data selected at the step S501 have come from the beginning of the matching range to the end (that is, whether or not all the pieces of map data in the matching range have been subjected to the processing). The matching unit 110 returns the processing to the step S501, if having decided that they do not come at the end, or shifts the processing to step S506, if having decided that they have come at the end.

At step S506, the matching unit 110 decides whether or not a position was located at the foregoing step S504. If having decided that a position was located, the matching unit 110 sets the position as a candidate vehicle position and terminates the processing. If having decided that a position is not located, it means that the degree of similarity of all the pieces of map data is less than the criterion value through the decision processing at the step S503. Therefore, the matching unit judges it abnormal and shifts the processing to step S507.

At step S507, instead of locating a position, the matching unit 110 performs processing so that information indicating an exception occurred is passed to a subsequent processing task (step S406 in FIG. 4).

Now terminating the description on FIG. 5, it is returned to the description on FIG. 4.

The foregoing description explained that, as a result of the step S405, the matching unit 110 uses, in processing at step S406, information representing a located position as a candidate vehicle position or information representing an exception occurred. At step S406, the matching unit 110 transfers either of the information to the estimated position determination unit 111. For instance, if an exception has occurred at step S405, the estimated position determination unit 111 also can know the exception occurred.

Figure 6:
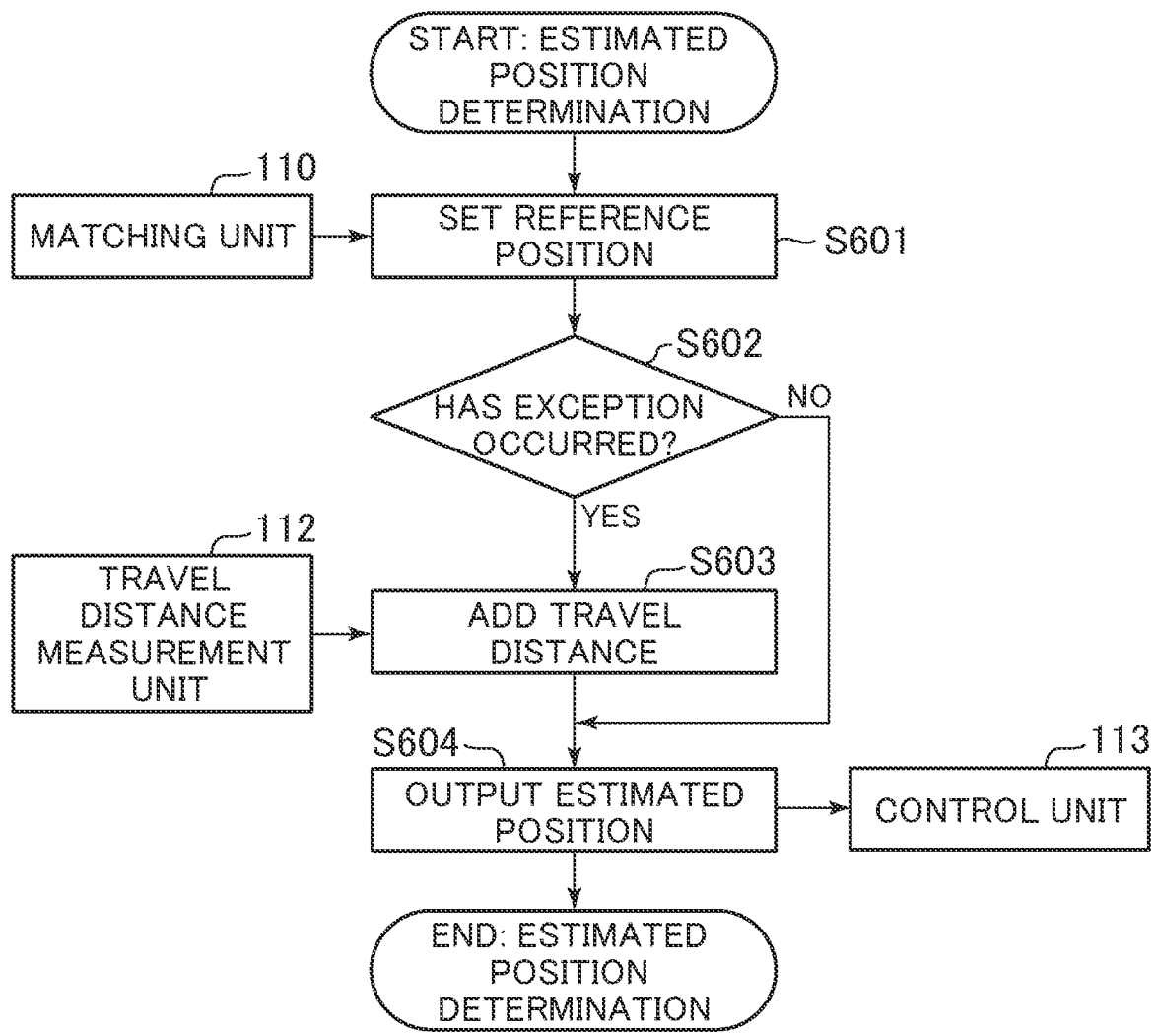
FIG. 6 is a diagram illustrating one example of a processing procedure related to an estimated position determination unit according to the first embodiment.

Now terminating the description on FIG. 4, a description of processing by the estimated position determination unit 111 is described using FIG. 6. Respective processing tasks (steps S601 thru S604) which are illustrated in FIG. 6 are executed by the estimated position determination unit 111. Each processing task is described below.

At step S601, the estimated position determination unit 111 reads in the position located by the matching unit 110 as a reference position. As described previously, information transferred from the matching unit 110 may be information representing an exception occurred, but not information representing the located position. In this case, the reference position that was read in previously remains as is.

At step S602, the estimated position determination unit decides whether or not the information from the matching unit 110, which was read in at the step S601, is information representing an exception occurred. The estimated position determination unit 111 shifts the processing to step S603, if having decided that it is information representing an exception occurred, or shifts the processing to step S604, if having decided that it is not information representing an exception occurred.

At step S603, the estimated position determination unit 111 reads in travel distance from the travel distance measurement unit 112, adds the travel distance after the reference position is set last time to the reference position, and determines a position thus obtained as the estimated position, and then, terminates the processing. Because an exception occurs in a case where the degree of similarity between measurement data and map data does not fulfill a certain criterion, that is, this processing prevents position information for which the reliability of the position located by the matching unit 110 is not sufficient from being reflected in the estimated position of the vehicle 101 and, instead, compensates vehicle position estimation using information of travel distance relative to or from a reliable position obtained last time.

At step S604, the estimated position determination unit 111 outputs to the control unit 113 the reference position determined at the step S601, if no exception has occurred, or the estimated position determined at the step S603, if an exception has occurred, and terminates the processing.

As described hereinbefore, according to the first embodiment, it is possible to estimate the position of the vehicle 101 traveling along the track 102 with high accuracy by localization using three-dimensional shapes of the contact line equipment (overhead wiring) for supplying electric power, spreading above the vehicle 101. Besides, when the three-dimensional shapes of the overhead wiring are not captured correctly because of failure of the sensing unit 108 (a distance sensor), a bad weather, or other causes, by compensating vehicle position estimation using information of travel distance measured by a separate means, functionality of controlling the vehicle 101 using its estimated position can be continued, maintaining reliability of the estimated position.

(2) Second Embodiment

In the following, a second embodiment is described using FIGS. 7 thru 9.

Figure 7:
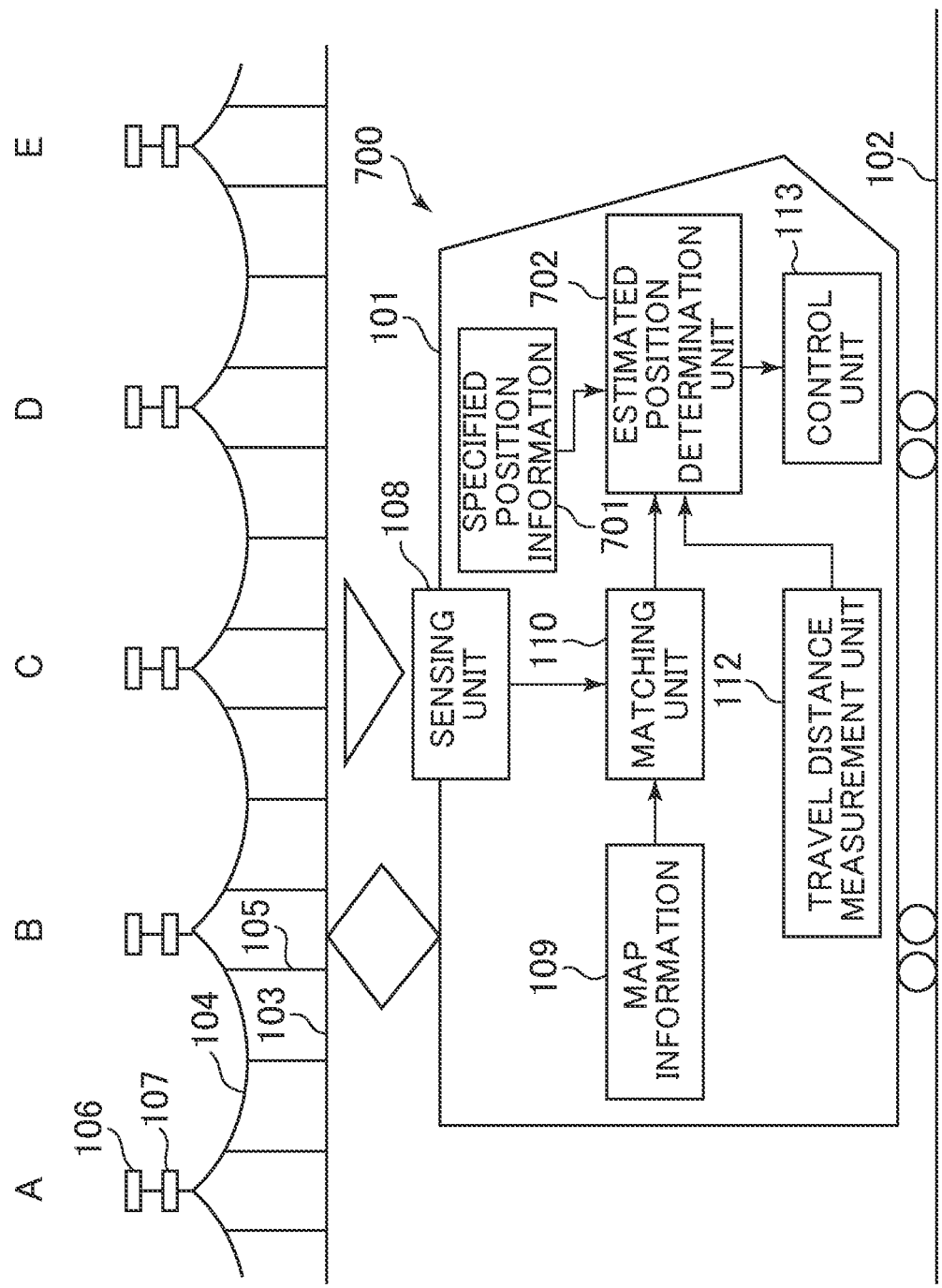
FIG. 7 is a diagram depicting one example of a configuration of a vehicle control system according to a second embodiment.

FIG. 7 is a diagram depicting one example of a configuration of a vehicle control system 700 of the present embodiment. In comparison with the configuration described in FIG. 1 in the first embodiment, differences are that specified position information 701 is added and, accordingly, a change is made to an estimated position determination unit 702 and the configuration other than those noted above is the same as the configuration described in FIG. 1. A different part of the configuration is mainly described below.

Specified position information 701 is data recorded in advance with respect to a section for which vehicle position estimation using the sensing unit 108 can be performed with high reliability, particularly. What is assumed to be such section is a section in which the supports 106 of the overhead wiring can be captured. This is because the supports 106 are made of a stiff material such as steel poles naturally due to their use and made comparatively huge among the components of the overhead wiring and the possibility that they cannot be detected by the sensing unit 108 is relatively low. Another may be a section in which the vehicle passes under an elevated structure among others. Also for a section like this, the possibility that the components cannot be detected by the sensing unit 108 can be expected to be relatively low.

Using FIG. 8, a data format of the specified position information 701 is described. A piece of the specified position information 701 is composed of ID of a specified position and a section corresponding to the specified position. As will be understood through a later description, a position localized from the three-dimensional shapes of the overhead wiring is reflected in the estimated position only in such a specified position.

Here, letters "A", "B", "C", etc. are used as the IDs of specified positions to match a notation to designate the supports 106 in FIG. 7; however, there is no limitation to this notation and other notations by which sections of specified positions can be identified may be used. Also, in this example, a section of a specified position is assumed to be equivalent to a distance of 10 m centering on a support 16. The sensing unit 108 is capable of sensing a support 106 from 5 m before and after the position of the support 106 and this range is set as a section of a specified position; however, there is no limitation to this. For example, a specified position may be denoted by one point on the track and a section relative to the point may be set by the estimated position determination unit 702.

processing by the estimated position determination unit 702 is described, using FIG. 9. In comparison with the processing by the estimated position determination unit 111 described using FIG. 6 in the first embodiment, the processing by the estimated position determination unit 702 is the same as that with the exception that step S901 is added between step S601 and step S602.

At step S901, the estimated position determination unit 702 decides whether or not the position located at the step S405 is a specified position (whether not it is in a section corresponding to a specified position). The estimated position determination unit 702 shifts the processing to step S602, if having decided that the position located is a specified position, or shifts the processing to step S603, if having decided that the position located is not a specified position. Thus, a subsequent flow of processing is the same as the processing described in FIG. 6.

That is, the estimated position determination unit 111 sets the located position as a reference position only when the vehicle is in a specified position or estimates the vehicle position based on travel distance when the vehicle is not in a specified position through the same processing as described using FIG. 6 in the first embodiment. In other words, it can apparently be said that this is a mechanism such that the vehicle position is usually estimated continuously based on travel distance and its position is localized with high accuracy and high reliability from three-dimensional shapes of the overhead wiring when the vehicle is in a specified position that appears sometimes, thus compensating errors accumulated in travel distance.

As described hereinbefore, according to the second embodiment, as with the first embodiment, it is possible to estimate the position of the vehicle 101 traveling along the track 102 with high accuracy by localization using three-dimensional shapes of the contact line equipment (overhead wiring) for supplying electric power, spreading above the vehicle 101. In addition, by narrowing down vehicle position estimation using three-dimensional shapes of the overhead wiring to sections in which such estimation can be performed with comparatively high accuracy and high reliability in view of characteristics of the three-dimensional shapes, it is possible to reduce opportunity of incorrect position estimation by erroneous localization and provide position information with higher reliability.

Additionally, an arrangement is made to latch (hold) an exception occurred during the step 405 across the sections and it can be arranged to stop the compensation even when the vehicle is in a specified position in the event that an exception has occurred when the vehicle is not in a specified position. This is equivalent to processing to localize a position from three-dimensional shapes of the overhead wiring when the vehicle is not in a specified position for the purpose of functionality diagnosis, though not reflecting it in the estimated position of the vehicle 101. Separating off an exception occurred was assumed to cope with a case where sufficiently precise three-dimensional shapes of the overhead wiring cannot be obtained because of abnormality of the sensing unit (a distance sensor), a bad weather or for other reasons; in such a case, accordingly, there is a large potential of failing to provide correct position information even when the vehicle is in a specified position. Hence, once abnormality has been detected through functionality diagnosis when the vehicle is not in a specified position, early stopping the functionality leads to providing position information with higher reliability in a sense of reducing the possibility of providing erroneous position information.

According to the configuration described above, a highly reliable vehicle control system can be implemented.

(3) Third Embodiment

While cases where the present invention is applied to the vehicle control systems 100 are described, 700 in the foregoing first and second embodiment; not limited to this, the present invention can be applied widely for other diverse vehicle control systems. [0076]

Besides, while a case where the system scans the overhead wiring provided along the track 102 on which the vehicle 101 travels and carries out the matching process, is described; the present invention is not restrictive to this. For example, the system may be adapted to scan the overhead wiring provided along another track provided in parallel with the track 102 on which the vehicle 101 travels (e.g., the track 102 is an up line and another track is a down line) and carry out the matching process. In this case, broadly, the matching unit carries out the process of matching between a data group representing three-dimensional shapes of structures provided beforehand adjacent to the track 102 on which the vehicle 101 travels and a data group representing three-dimensional shapes of objects measured by the sensing unit 108. In addition, the map information 109 is one example of information on multiple structures in which a data group representing three-dimensional shapes of structures provided beforehand adjacent to the track 102 on which the vehicle 101 travels is associated with position information representing the positions of the structures.

Moreover, for example, the system may be adapted to scan both the overhead wiring provided along the track 102 on which the vehicle 101 travels and the overhead wiring provided along another track provided in parallel with the track 102 (e.g., the track 102 is an up line and another track is a down line) and carry out the matching process. When both the overhead wirings are subject to the matching process, the matching process can be executed much more than in the case of one overhead wiring and, therefore, it becomes possible to determine estimated positions of the vehicle 101 with higher accuracy.

As for the foregoing configurations, they can be modified, parts of them can be combined, or a part of them can be removed, as appropriate, without exceeding the scope of the invention.

LIST OF REFERENCE SIGNS

100 . . . vehicle control system, 100 . . . vehicle, 102 . . . track, 103 . . . trolley wire, 104 . . . catenary, 105 . . . hanger, 106 . . . support, 107 . . . insulation, 108 . . . sensing unit, 109 . . . map information, 110 . . . matching unit, 111 . . . estimated position determination unit, 112 . . . travel distance measurement unit, 113 . . . control unit.

The invention claimed is:

1. A vehicle control system comprising:
a sensing unit which is provided on a vehicle and measures three-dimensional shapes of objects;
a matching unit which performs a process of matching between information on a plurality of structures in which a data group representing three-dimensional shapes of structures provided beforehand adjacent to a track on which the vehicle travels is associated with position information representing positions of the structures and a data group representing three-dimensional shapes of objects measured by the sensing unit and locates positions of the objects; and
an estimated position determination unit which sets a position located by the matching unit as a reference position and determines an estimated position of the vehicle based on the reference position,
characterized in that:
the structures provided beforehand are components constituting contact line equipment adjacent to the track including a trolley wire and a catenary and hangers to hang and support the trolley wire; and
the sensing unit is installed in a position shifted from underneath a trolley wire which is one of the components constituting the contact line equipment and measures three-dimensional shapes of the contact line equipment from an oblique direction.

2. The vehicle control system according to claim 1, characterized in that:
the vehicle control system comprises a travel distance measurement unit which measures travel distance of the vehicle from the reference position; and
the estimated position determination unit adds travel distance measured by the travel distance measurement unit to the reference position and determines a position thus obtained as an estimated position of the vehicle.

3. The vehicle control system according to claim 2, characterized in that:
the matching unit calculates a degree of similarity between each piece of data in a data group representing three-dimensional shapes of structures in a predetermined range on the track and a data group representing three-dimensional shapes of objects measured by the sensing unit and decides whether or not the degree of similarity of each exceeds a threshold; and
if it has been decided by the matching unit that no degree of similarity exceeds the threshold, the estimated position determination unit adds travel distance measured by the travel distance measurement unit to the reference position and determines a position thus obtained as an estimated position of the vehicle.

4. The vehicle control system according to claim 3, characterized in that, as a range that is subject to the process of matching next to the predetermined range, the matching unit sets a range on the track in which the vehicle is anticipated to be positioned, based on the estimated position of the vehicle and speed of the vehicle.

5. The vehicle control system according to claim 1, characterized in that the vehicle control system comprises a control unit which performs control of the vehicle using estimated positions of the vehicle determined by the estimated position determination unit.

6. The vehicle control system according to claim 1, characterized in that:
specified position information is provided which represents specified positions of structures specified beforehand among the structures provided beforehand; and
the estimated position determination unit decides whether or not a position located by the matching unit is a specified position and, if having decided that it is the specified position, sets the specified position as the reference position and determines the reference position as an estimated position the vehicle.

7. The vehicle control system according to claim 6, characterized in that the structures specified beforehand are supports which are component of contact line equipment adjacent to the track.

* * * * *